Aug. 25, 1942.   F. L. LE BUS   2,293,907
MULTIPLE ROLLER GEARING POWER TRANSMISSION
Filed May 10, 1941
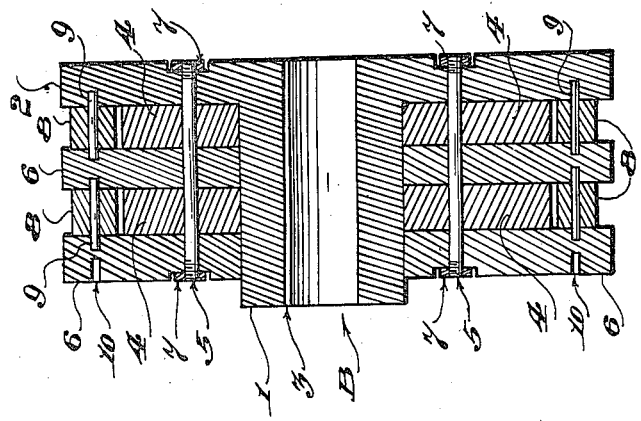
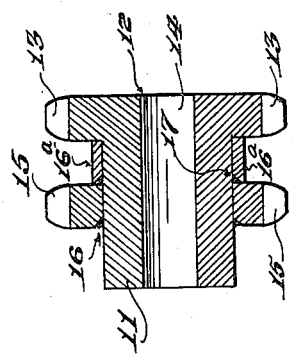
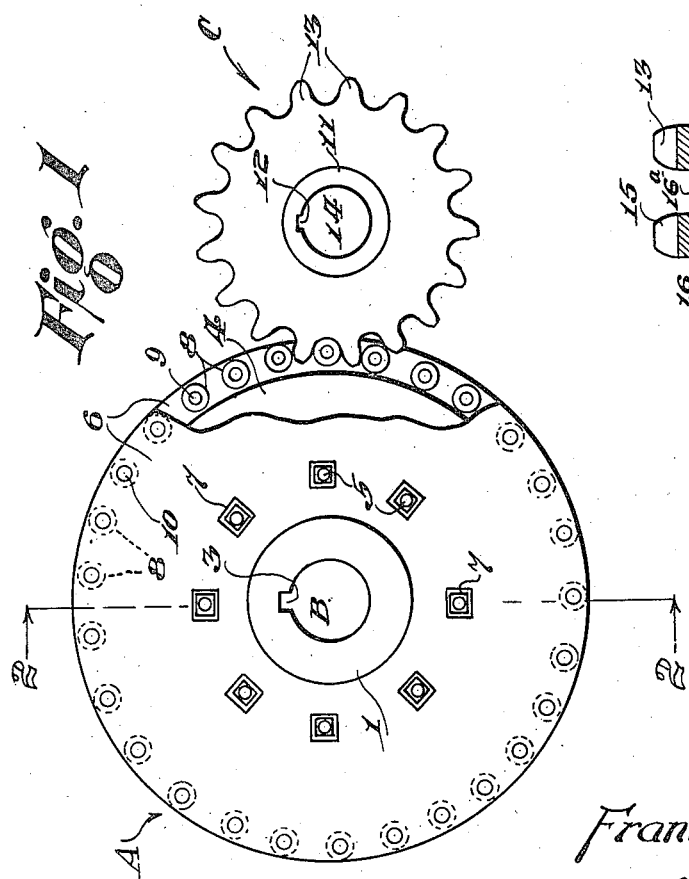
Franklin L. LeBus
INVENTOR.
BY John M. Spellman Patented Aug. 25, 1942

2,293,907

UNITED STATES PATENT OFFICE 2,293,907

MULTIPLE ROLLER GEARING POWER TRANSMISSION

Franklin L. Le Bus, Longview, Tex.

Application May 10, 1941, Serial No. 392,841

1 Claim. (Cl. 74—414)

This invention relates to mechanical movements and it has particular reference to a device whereby torque from a driving to a driven shaft may be transmitted with a minimum of fractional loss.

The general object of the invention is to provide a mechanical movement wherein the conventional sliding friction of planetary gears is reduced to a minimum by means of a plurality of rollers in connection with a multiple sprocket gear assembly, thereby changing the sliding friction to a rolling friction.

More particularly, the object of the invention is to provide a mechanical movement wherein speed increase or reduction of speed may be obtained by the production of a specially constructed roller sprocket and an especially constructed gear sprocket, whereby additional rollers and additional gears may be placed thereon as desired.

The invention also includes novel features of construction in bringing about the objects set out above, all of which may be more readily understood from a perusal of the following detailed description, taken in connection with the accompanying drawing, and in the drawing:

Figure 1 is an elevational view of a roller sprocket and a multiple gear sprocket in operable position, and embodying the invention;

Figure 2 is a transverse vertical sectional view of the roller sprocket shown in Figure 1, the view being taken on the line 2—2 thereof; and Figure 3 is a sectional view of the toothed sprocket assembly shown in Figure 1.

In accordance with the drawing, and as illustrated in Figure 1, the roller sprocket, indicated generally at A, and which is to be mounted upon a shaft, consists of a hub 1 and a series of disks on which the rollers are mounted. For this purpose the drive hub 1 is made integrally with a circular formation 2, the hub having a bore B and a keyway 3 for affixing the hub to a drive shaft. Mounted on the hub 1 in spaced relation as shown in Figure 2, are a series of disks or circular plates 4, each disk or plate having a central opening so that it may embrace the hub and also provided with openings for the insertion of a bolt 5. The bolts 5 also pass through the circular formation 2 of the hub. The construction also includes a series of disks or circular plates 6, also provided with a central opening and embracing the hub, the diameter of the disks 6 being equal to the diameter of the hub section or circular formation 2. The disks 6 have openings for insertion of the bolts 5, and the outer disk 6 and the circular formation 2 of the hub includes recesses so that the nuts 7 may be countersunk and be flush with these parts. It will be observed that the disks or circular plates 4 are of smaller diameter than the plates or disks 6 and provide spacing means between the disks 6 for the rollers 8. These rollers are mounted upon the pins 9 and the ends of the pins are seated in a bored opening in the circular formation 2 and in the plates or disks 6. Similar openings indicated at 10 in the outer plate or disk 6 are provided for the mounting of additional parts of the assembly when desired.

In Figure 1 the roller sprocket A is shown in meshed relation with the multiple sprocket gear assembly indicated generally at C and which has a hub 11 and a keyway 12 for mounting the assembly upon a shaft. In Figure 3 there is shown the manner of construction of the multiple sprocket gear assembly. Each gear is mounted on a hub 11, similar in construction to the hub of the roller sprocket assembly A, and each gear is built up of teeth 13 which form a continuation with the hub 11, having a keyway 12 and a shaft opening 14. Additional teeth 15 are welded as at 16 to the hub and spaced apart longitudinally of the shaft by the spacers 16$^a$, also welded to the hub as shown at 17, and in this manner additional teeth may be added as required.

In the operation of the device, the rollers 8 engage with the teeth 13 and 15 and the spacers 16 ride over the peripheries of the disks 6 and the formation 2 of the hub 1. In this way it will be seen that friction is greatly reduced and a much smoother action and engagement of the two elements is obtained. Also it will be apparent that the power and speed may be increased by altering the diameters of the drive and driven means and increasing the number of rollers and teeth thereon.

The disclosure may, however, be modified and altered in keeping with the spirit and meaning of the invention and to an extent which may be said to come within the scope and range of the claim appended hereto.

What is claimed is:

A multiple roller gearing power transmission for transferring power from a drive shaft to a driven shaft, comprising a drive sprocket assembly consisting of a plurality of circular disks of a predetermined diameter and a plurality of circular disks of a larger diameter, an elongated hub having an abutting disk on one end, the said disk being equal in size to the disks of said larger diameter, all of said disks being bored to be received on the hub, the smaller disks being interposed between the disks of larger diameter to provide a space for roller bearings, and a plurality of roller bearings disposed in said spaces with means for supporting the bearings on the outer circumferential margins of the larger disks; and a sprocket gear assembly consisting of a plurality of gears, an elongated hub having an abutting gear on one end, the said gears being equal in diameter to the abutting gear and bored to be mounted on the hub, and means for spacing the gears on the hub; the drive sprocket assembly and the sprocket gear assembly capable of being built up or reduced by increasing or decreasing the disks and gears according to power desired.

FRANKLIN L. LE BUS.